United States Patent
Berthaud et al.

(10) Patent No.: US 6,595,452 B1
(45) Date of Patent: Jul. 22, 2003

(54) CABLE REEL AND ELECTROMAGNETIC WAVE COMMUNICATION DEVICE EQUIPPED WITH SUCH A REEL

(75) Inventors: Philippe Berthaud, Tonnerre (FR); Patrice Hirtzlin, Rennes (FR)

(73) Assignee: Thomson Licensing, S.A., Boulogne-Billancourt (FR)

(*) Notice: Subject to any disclaimer, the term of this patent is extended or adjusted under 35 U.S.C. 154(b) by 0 days.

(21) Appl. No.: 09/685,520

(22) Filed: Oct. 10, 2000

(30) Foreign Application Priority Data

Oct. 13, 1999 (FR) ............................... 99 12754

(51) Int. Cl.[7] ............................... B65H 75/38
(52) U.S. Cl. ................................... 242/388.1
(58) Field of Search ............... 242/388.1, 160.1, 242/160.2, 160.3, 579, 580, 615.3, 388.6; 239/11, 13, 14, 20, 18; 455/90; 70/609; 174/84 R, 86; 191/12 R, 12.2 R, 12.4

(56) References Cited

U.S. PATENT DOCUMENTS

| | | | |
|---|---|---|---|
| 3,337,695 A | | 8/1967 | Brown ..................... 191/12.4 |
| 4,713,497 A | | 12/1987 | Smith ..................... 191/12.2 |
| 4,722,690 A | * | 2/1988 | Priede ........................ 439/15 |
| 4,744,763 A | * | 5/1988 | Suzuki et al. ................. 439/15 |
| 4,824,396 A | * | 4/1989 | Sasaki et al. ................ 439/475 |
| 4,904,190 A | * | 2/1990 | Plocek et al. ................. 439/15 |
| 4,975,063 A | * | 12/1990 | Ida et al. ..................... 439/15 |
| 5,049,082 A | * | 9/1991 | Carter ......................... 439/15 |
| 5,229,544 A | * | 7/1993 | Horiuchi et al. ............. 174/52.1 |
| 5,238,419 A | * | 8/1993 | Roeder et al. ................ 439/164 |
| 5,256,075 A | * | 10/1993 | Miyahara et al. ............. 439/164 |
| 5,286,219 A | * | 2/1994 | Ueno et al. .................. 439/475 |
| 5,547,144 A | * | 8/1996 | Sakamoto et al. ........... 242/402 |
| 5,685,728 A | * | 11/1997 | Okuhara et al. ............. 439/164 |
| 5,702,260 A | * | 12/1997 | Kato et al. .................. 439/164 |
| 5,762,508 A | * | 6/1998 | Tanaka et al. ............... 439/164 |
| 5,841,069 A | * | 11/1998 | Nagaoka et al. .............. 174/69 |
| 5,863,010 A | * | 1/1999 | Boomgaarden ............... 242/388 |
| 5,899,401 A | * | 5/1999 | Reimann et al. ............. 242/372 |
| 6,096,976 A | * | 8/2000 | Nagaoka et al. .............. 174/69 |
| 6,099,331 A | * | 8/2000 | Kikkawa et al. ............. 439/164 |

FOREIGN PATENT DOCUMENTS

| | | | | |
|---|---|---|---|---|
| EP | 0217336 | | 4/1987 | ............ B25J/19/00 |
| EP | 0413911 | | 2/1991 | ............ B60R/16/00 |
| FR | 73 37896 | | 10/1973 | ............ H01R/35/00 |
| FR | 2249458 | | 5/1975 | ............ H01R/35/00 |
| FR | 2.249.458 A1 | * | 5/1975 | ............ H01R/35/00 |
| WO | 92/08254 | | 5/1992 | ............ H01Q/15/02 |

* cited by examiner

Primary Examiner—Donald P. Walsh
Assistant Examiner—Mark J. Beauchaine
(74) Attorney, Agent, or Firm—Joseph S. Tripoli; Joseph J. Laks; Reitseng Lin

(57) ABSTRACT

The invention proposes the use of a reel, for instance for a device for electromagnetic wave communication, comprising a first component movable in rotation in relation to a second component about an axis and at least one first cable fixed to the first component at at least one point. The first cable is fixed to the second component at at least one point and the first cable is wound spirally about the axis. The reel comprises at least one second cable wound spirally about the axis and separated from the first cable by a first flange perpendicular to the axis.

10 Claims, 4 Drawing Sheets

CABLE REEL AND ELECTROMAGNETIC WAVE COMMUNICATION DEVICE EQUIPPED WITH SUCH A REEL

PRIORITY

Priority is claimed per 35 USC 119 under French application serial number 9912754 Filed Oct. 13, 1999.

FIELD OF THE INVENTION

The present invention relates to a cable reel and to an electromagnetic wave communication device equipped with such a reel.

BACKGROUND OF THE INVENTION

A device (such as an antenna) intended for communication, based on electromagnetic signals, with satellites movable in the terrestrial reference system comprises, in general terms, at least one first and one second component movable in rotation relative to one another (pivot connection). It is necessary, at this pivot connection, to ensure the continuity of the electrical signals carried by various cables (information transmission, supply or command signals).

A conventional solution for ensuring such continuity involves using rotating contacts. However, this solution has a high cost and proves relatively uncertain as regards operating reliability.

SUMMARY OF THE INVENTION

In order to overcome these disadvantages, the invention provides a reel which comprises a first component movable in rotation in relation to a second component about an axis and at least one first cable fixed to the first component at at least one point, in which the first cable is fixed to the second component at at least one point and in which the first cable is wound spirally about the axis.

The first cable ensures the transmission of the information in one direction; in order to make it possible to transmit the information in the opposite direction, the reel comprises at least one second cable wound spirally about the axis and separated from the first cable by a first flange perpendicular to the axis.

It is also proposed that the first flange comprise a hole for the passage of the second cable and be fixed to the second component. Thus, it is not necessary for the second component to form a guide for the second cable at the height (along the axis) of the spirals formed by the first and second cables. With the dimensions of the system being constant, this makes it possible to increase the ratio of the outer radius to the inner radius of the spiral and therefore to increase the possibility of relative rotation of the first and second components.

The first cable is received in a first magazine delimited axially by a second flange and by the first flange. The second cable is received in a second magazine delimited axially by the first flange and by the first component. A third cable is received in a third magazine delimited axially by the second flange and by the second component.

The first magazine and the second magazine are delimited radially by the first component, on the one if hand, and by the second component, on the other hand. The third magazine is delimited radially by a wall emanating from the second flange, on the one hand, and by the second component, on the other hand. The second flange is fixed to the second component.

The invention also provides a device for electromagnetic wave communication, comprising at least one transmitter/receiver assembly connected mechanically and electrically to a plinth, and also such a reel.

BRIEF DESCRIPTION OF THE DRAWINGS

The invention will now be described with reference to the accompanying drawings in which.

DETAILED DESCRIPTION OF A PREFERRED EMBODIMENT

Figure 1:
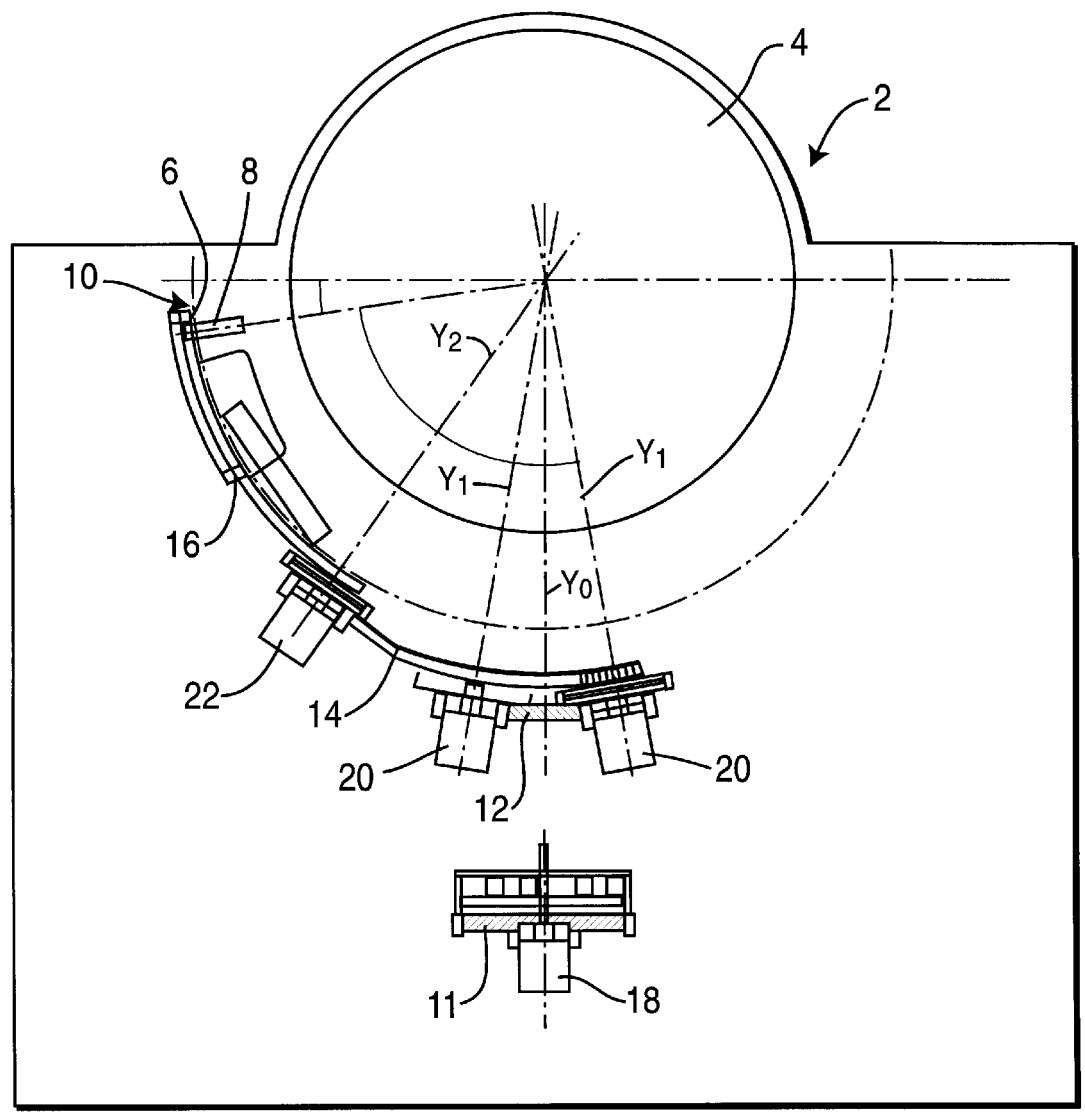
FIG. 1 is a general elevational view of an antenna according to the invention.
Figure 2:
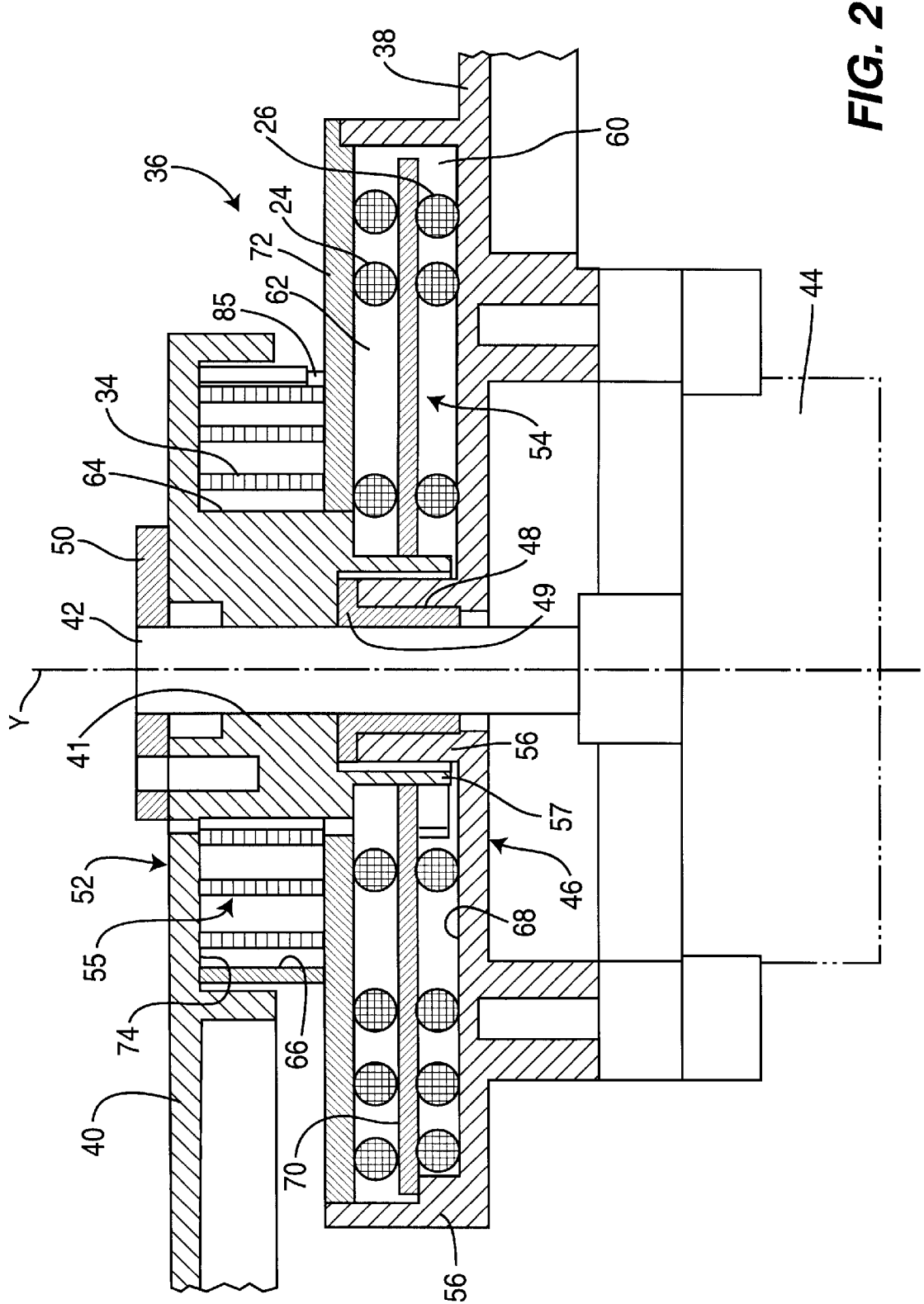
FIG. 2 is a view of a detail of a joint of the antenna of FIG. 1 which incorporates a reel according to the invention.
Figure 3:
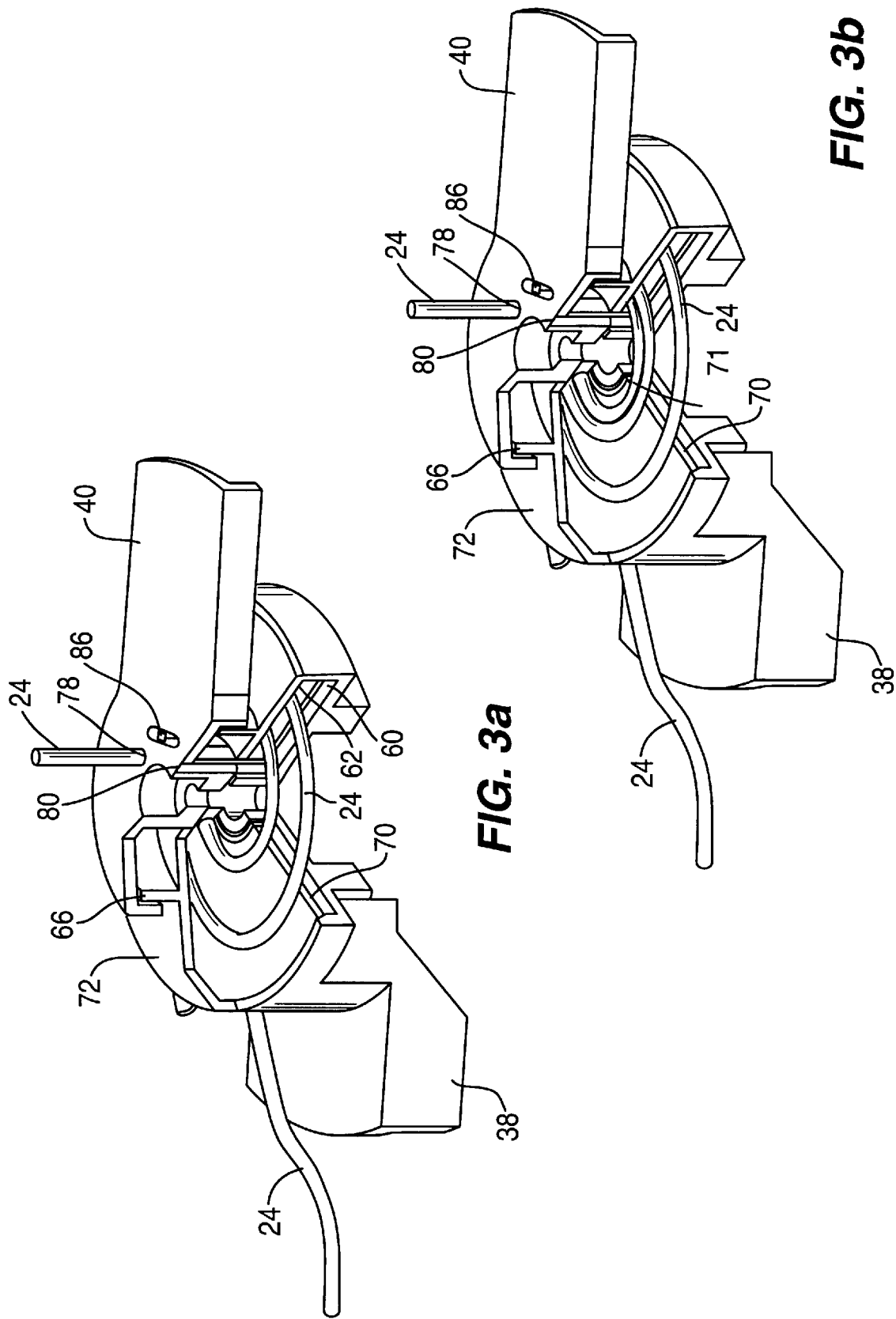
FIGS. 3a and 3b are sectional views of the joint of FIG. 2 with regard to two relative positions of the lower and upper arms.
Figure 4:
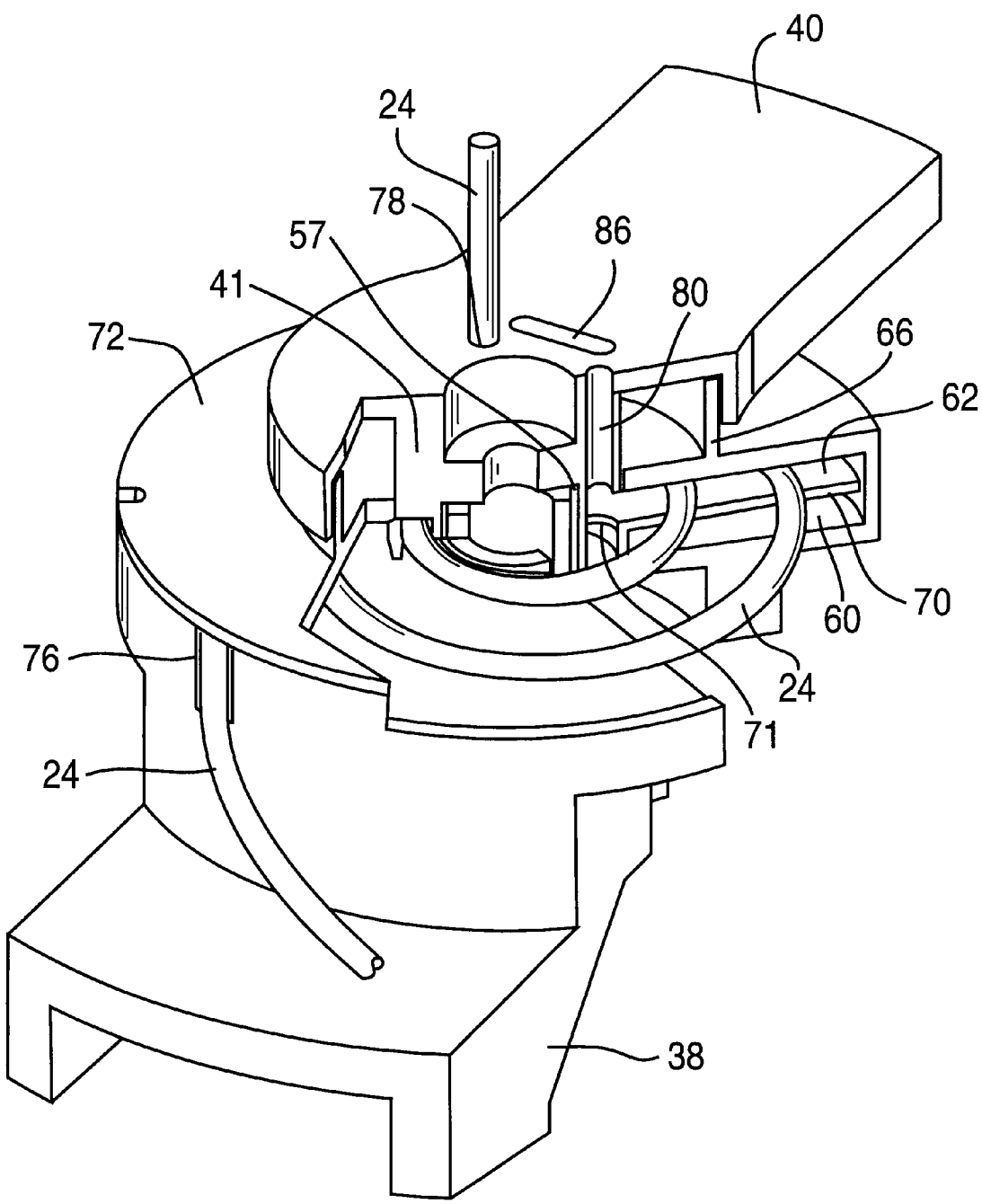
FIG. 4 is another sectional view of the joint of FIG. 2.

In order to receive electromagnetic signals emanating from satellites and to transmit this same type of signal towards satellites, an antenna 2, designed on the principle of the Luneberg lens and illustrated in FIG. 1, comprises essentially a sphere 4 consisting mainly of a dielectric material, and also receivers 6 and transmitters 8.

As illustrated in the patent EP 0 555 262, the sphere 4 polarizes a plane wave incident at a focal point which is outside the sphere 4 and where a receiver 6 will therefore be placed. Likewise, a wave transmitted in the direction of the sphere 4 by a point source (such as a transmitter 8) located at the focal point will generate a plane wave. The focal point is variable as a function of the direction of the incident or transmitted plane wave.

As regards satellite transmissions, the electromagnetic waves carrying the signals are considered as being plane waves, the direction of which is a straight line connecting the antenna to the satellite.

The antenna 2 is more particularly intended for communication with low-altitude satellites, the orbit of which is at an altitude below the altitude of geostationary satellites. Such satellites are movable in the terrestrial reference system. The direction of the incident and transmitted plane waves is therefore variable. The receiver 6 and the transmitters 8 are movable, so as to be positioned at any moment at the focal point F assigned to the direction of the incident wave.

The fact that these satellites move in a terrestrial reference system implies, moreover, that they may disappear from the field of vision, for example by passing below the skyline. Consequently, there is provision for using constellations of satellites which all transmit the same signal. The antenna 2 is equipped with two transmitter/receiver assemblies 10 which take over from one another so as to obtain a continuous reception signal and always have the possibility of transmitting towards a satellite of the constellation.

The two transmitter/receiver assemblies 10 are mounted on a complex mechanical system consisting of the following elements:

a plinth 11 fixed in the terrestrial reference system;

a base 12 movable in rotation relative to the plinth 11 about a preferably (but not necessarily) vertical axis $Y_0$;

two shoulder arms 14, each mounted at a point of the base in rotation about a respective axis $Y_1$;

two elbow arms 16, each mounted on a respective shoulder arm 14 in rotation about a respective axis $Y_2$.

Each transmitter/receiver assembly 10 is mounted on a respective elbow arm 16.

It will be seen that FIG. 1 shows only one shoulder arm 14 and only one elbow arm 16 for the sake of clarity in the drawing.

The rotational position of the base 12 in relation to the plinth 11, of each shoulder arm 14 in relation to the base 12 and of each elbow arm 16 in relation to the associated shoulder arm 14 is variable by means of as many motors 18, 20, 22 mounted on each axis of rotation. More specifically, the motor 18 allows a rotational movement of the base 12, each motor 20 allows a rotational movement of the corresponding shoulder arm 14 in relation to the base 12 and each motor 22 allows a rotational movement of the elbow arm 16 in relation to the shoulder arm 14 on which the said elbow arm is mounted.

The whole of the components which make it possible to connect one mechanical element 12, 14, 16 in terms of rotation in relation to another will be designated as a joint.

The motors 18, 20, 22 are controlled by means of an electronic control circuit (not shown) which displaces the various elements, in such a way that the two transmitter/receiver systems 10 are each placed at a focal point F assigned to the reception direction of a satellite of the constellation.

The plinth 11 contains the electrical supply, the electronic control circuit and the circuit for processing the signals received and transmitted. The following electrical connections are made between the plinth 11 and the transmitter/receiver assembly 10:

- a cable 24 for the transmission of the signal received (high-frequency signal), in the form of a first coaxial cable;
- a cable 26 for the transmission of the signal to be transmitted (high-frequency signal), in the form of a second coaxial cable;
- a cable for the transmission of the power supply of the amplifier of the transmitter 8;
- cables for the electrical supply of the motors 18, 20, 22;
- cables for the transmission of the information for the control of the motors 18, 20, 22, the said information being generated by the electronic control circuit (low-frequency signal).

The supply cables 28, 30 and the control cables 32 are combined in a flat sheet-like cable (third cable) 34 (FFC, standing for Flexible Flat Cable).

In order to ensure the electrical continuity of the various cables 24, 26, 28, 30, 32, in spite of the rotation of the various mechanical elements (base 12, shoulder arm 14, elbow arm 16) relative to one another, a cable reel 36 is provided at each joint.

A reel 36 is described below, with reference to FIGS. 2, 3a, 3b and 4, which relates to a base 12/shoulder arm 14 joint or shoulder arm 14/elbow arm 16 joint respectively, with a knowledge that the reels 36 relating to these joints are produced on the same principle. Within this framework, the term "lower arm 38" will denote that of the two arms of the joint which is mechanically nearest to the plinth 11 (base 12 or shoulder arm 14 respectively) and the term "upper arm 40" will denote that which is furthest away (shoulder arm 14 or elbow arm 16 respectively).

It will be seen, moreover, that it is possible to produce a joint between the plinth 11 and the base 12 by means of the same technique.

The joint between the lower arm (first component) 38 and the upper arm (second component) 40 consists mainly of a shaft 42 fixed to the upper arm 40. The shaft 42 is mounted on the upper arm 40 in the region of a hub 41 which extends from the lower face 74 of the upper arm 40 (that is to say, the face turned towards the lower arm 38). The shaft 40 is driven in rotation by a motor 44 (which is therefore the motor 20 or the motor 22, depending on the joint). The motor 44 is fixed to the lower arm 38.

More specifically, the motor 44 is mounted on the lower face 46 of the lower arm 38 (that is say, on the face opposite to the upper arm 40); the rotary shaft 42 passes through the lower arm 38, with an anti-friction ring 48 interposed, and then the upper arm 40. The rotary shaft 42 is fastened to the upper arm 40 by means of a nut 50 mounted at the upper end of the shaft 42 and bearing on the upper face 52 of the upper arm 40 (that is say, the face opposite to the lower arm 38).

In the rest of the description, the terms "radial" and "axial" are understood as being in relation to the axis Y of the rotary shaft 42. The terms "lower" and "below" mean, in relation to the direction of the axis Y, in the direction from the upper arm 40 towards the lower arm 38. The terms "upper" and "above" mean, in relation to the direction of the axis Y, in the direction from the lower arm 38 towards the upper arm 40.

The reel 36 comprises an annular lower receptacle 54 delimited radially by a small-diameter cylindrical wall 56 of axis Y and by a large-diameter cylindrical wall 58 of axis Y. The lower receptacle 54 comprises a lower magazine (second magazine) 60 which receives a second coaxial cable 26 and an intermediate magazine (first magazine) 62 which receives the first coaxial cable 24.

More specifically, the lower receptacle 54 is delimited axially by a lower wall 68 perpendicular to the axis Y and formed by the upper face of the lower arm 38. The cylindrical walls 56, 58 are likewise produced integrally in the lower arm 38.

The lower magazine 60 and the intermediate magazine 62 each have a height (parallel to the axis Y) which is very slightly greater than the diameter of the coaxial cables 24, 26, for example 0.2 mm greater. In each magazine 60, 62, the coaxial cable 24, 26 is wound spirally about the axis Y over a single thickness, thus producing concentric turns, the radius of which varies along the cable 24, 26.

The reel 36 also comprises an annular upper receptacle 55 delimited by a small-diameter cylindrical wall 64 of axis Y and by a large-diameter cylindrical wall 66 of axis Y. The upper receptacle 55 defines an upper magazine (third magazine) which receives the flat sheet-like cable 34. The height of the upper magazine 55 corresponds to the width of the flat sheet-like cable 34. The flat cable 34 is would spirally about the axis Y, the width of the flat cable 34 extending parallel to the axis Y.

The anti-friction ring 48 has, at its upper end, an annular wing 49 which makes it possible for it to be retained axially between the lower arm 38 and the upper arm 40. More specifically, the upper face of the wing 49 bears axially on a face of the hub 41 and the lower face of the wing 49 bears axially on the small-diameter cylindrical wall 56 of the lower receptacle 54.

The separation between the lower magazine 60 and the intermediate magazine 62 is made by a first flange 70 of annular general shape, arranged perpendicularly to the axis Y and fixed in terms of rotation to the upper arm 40. The separation between the intermediate magazine 62 and the upper magazine 55 is made by a second flange 72 of annular general shape, arranged perpendicularly to the axis Y and fixed in terms of rotation to the lower arm 38.

The lower magazine 60 and the intermediate magazine 62 are delimited radially by the large-diameter cylindrical wall 58 of the lower receptacle 54, on the one hand, and by a collar 57 produced in the upper arm 40 at the end of the hub 41, on the other hand. The collar 57 has a cylindrical slope of axis Y. The collar 57 has a radius greater than the radius of the small-diameter cylindrical wall 56 of the lower receptacle 54, but a radius smaller than the outer radius of the hub 41.

The component which forms the second flange 72 also carries the large-diameter cylindrical wall 66 of the upper receptacle 55. The upper wall of the upper receptacle 55 is produced by a part of the lower face 74 of the upper arm 40. The small-diameter cylindrical wall 64 of the upper receptacle 55 is formed by the outer surface of the hub 41.

Each coaxial cable 24, 26 penetrates into its respective magazine 62, 60 by means of an orifice 76 in the large-diameter cylindrical wall 58 of the lower receptacle 54. Each coaxial cable 24, 26 is immobilized at the orifice 76. Thus, that part of each coaxial cable 24, 26 which is level with the lower arm 38, outside the lower receptacle 54 (that is to say, outside the lower magazine 60 and intermediate magazine 62), is fixed in relation to the lower arm 38.

Moreover, each coaxial cable 24, 26 passes through the upper arm 40 (and thereby through the upper magazine 55) by means of a respective duct 78, 80 produced in the hub 41 and parallel to the axis Y. Each coaxial cable 24, 26 is immobilized relative to its respective duct 78, 80, in such a way that that part of each coaxial cable 24, 26 which is level with the upper arm 40, outside the lower receptacle 54 and the ducts 78, 80, is fixed in relation to the upper arm 40.

More specifically, the second cable 26 contained in the lower magazine 60 passes through the first flange 70 at a hole 71, the intermediate magazine 62 and the upper arm 40 by means of the duct 80. It will therefore be understood that it is necessary for the first flange 70 to be fixed to the upper arm 40, as specified above.

For each coaxial cable 24, 26, the two ends of that part of the cable which is located in the magazine 62, 60 are therefore fixed, one in relation to the lower arm 38 and the other in relation to the upper arm 40. During the rotation of one arm in relation to the other, the radius at each point of the cable 24, 26 is adjusted mechanically, in such a way that the angular distance between the two ends corresponds to that length of the cable 24, 26 which is located in the magazine 62, 60 (this length being constant). Reference may be made, for example, to FIGS. 3a and 3b which illustrate respectively the coaxial cable 24 in two different arrangements due to a rotation of the upper arm 40 by one turn in relation to the lower arm 39.

Depending on the number of turns of one arm in relation to the other which is to be capable of being executed, the radial dimension of the magazine 62, 60 are determined in such a way that the latter accepts all the variations in radius which are liable to occur.

For example, the ratio of the inner and outer radii of the magazine is 4.3 for the possibility of executing 1 turn and 6.3 for the possibility of executing 3 turns.

The use of the hole 71 for the passage of the second coaxial cable 26 through the flange 70 fixed to the upper arm 40 makes it possible to avoid extending the duct 80 (and therefore the hub 41) in the region of the lower receptacle 54 along the axis Y. Consequently, it is possible for the collar 57 radially delimiting the lower and intermediate magazines to be produced with a radius smaller than that of the hub 41. With given external dimensions (with the radius of the large-diameter cylindrical wall determined), the ratio of the inner and outer radii is thus improved, thereby making it possible to increase the possible angle of rotation.

A flat sheet-like cable 34 passes through the large-diameter wall 66 of the upper magazine 55 at an orifice 85 and through the upper arm 40 via a slot 86 at which it is immobilized. As described above, the width of the flat sheet-like cable 34 (that is to say, its dimension according to which the various cables 28, 30, 32 are aligned) extends parallel to the axis Y of the reel 36.

The flat sheet-like cable 34 is wound spirally about the axis Y. The two ends of that part of the flat sheet-like cable 34 which is located in the upper magazine 55 are fixed (one at the orifice 85 and therefore in relation to the second flange 72 fixed to the lower arm 38; the other at the slot 86 and therefore in relation to the upper arm 40), in such a way that the behaviour of the flat sheet-like cable 34 during the rotation of one arm in relation to the other is similar to the behaviour described above with regard to the coaxial cables 24, 26.

It will be seen that not all the cables forming the flat sheet-like cable 24 terminate at the transmitter/receiver assembly 10, since some of them stop in the region of the arm which carries the motor which these control or supply. Thus, the number of cables forming the flat sheet-like cable 34 is not equal in all the upper magazines 55.

The reel 36 which has just been described makes it possible at reasonable cost to make a particularly reliable electrical connection at the lower arm 38/upper arm 40 joint, especially because this solution does not require the use of any link-up since the cables 24, 26, 34, especially the coaxial cables 24, 26, are not interrupted when they pass through the joint.

On the other hand, the number of components forming the reel 36 is reduced to a minimum, especially due to the fact that the large-diameter walls 58, 66 of the lower magazine 54 and of the upper magazine 55 and the collar 57 are produced respectively on the lower arm 38, on the second flange 72 and on the hub 41.

What is claimed is:

1. A reel comprising a first component movable in rotation in relation to a second component about an axis and at least one first cable fixed to the first component at at least one point, wherein the first cable is fixed to the second component at at least one point, wherein the first cable is wound spirally about the axis, wherein at least one second cable is wound spirally about the axis and separated from the first cable by a first flange perpendicular to the axis, and wherein the first flange comprises a hole for the passage of the second cable and is fixed to the second component.

2. A reel comprising a first component movable in rotation in relation to a second component about an axis and at least one first cable fixed to the first component at at least one point, wherein the first cable is fixed to the second component at at least one point, wherein the first cable is wound spirally about the axis, wherein at least one second cable is wound spirally about the axis, and separated from the first cable by a first flange perpendicular to the axis, wherein the second cable is received in a magazine delimited axially by the first flange and by the first component, and wherein the first flange is fixed to the second component.

3. A reel according to claim 2,
wherein the first flange comprises a hole for the passage of the second cable.

4. A reel comprising a first component movable in rotation in relation to a second component about an axis and at least one first cable fixed to the first component at at least one point,
   wherein the first cable is fixed to the second component at at least one point,
   wherein the first cable is wound spirally about the axis,
   wherein at least one second cable is wound spirally about the axis and separated from the first cable by a first flange perpendicular to the axis,
   wherein the first cable is received in a first magazine delimited axially by a second flange and by the first flange,
   wherein a third cable is received in a third magazine delimited axially by the second flange and by the second component, and
   wherein the third magazine is delimited radially by a wall emanating from the second flange, on the one hand, and by the second component, on the other hand.

5. A reel according to claim 4,
wherein the second flange is fixed to the first component.

6. A reel according to claim 4,
wherein the second cable is received in a second magazine delimited axially by the first flange and by the first component.

7. A reel comprising a first component movable in rotation in relation to a second component about an axis and a least one first cable fixed to the first component at at least one point,
   wherein the first cable is fixed to the second component at a least one point,
   wherein the first cable is wound spirally about the axis,
   wherein at least one second cable is wound spirally about the axis and separated from the first cable by a first flange perpendicular to the axis,
   wherein the first cable is received in a first magazine delimited axially by a second flange and by the first flange,
   wherein a third cable is received in a third magazine delimited axially by the second flange and by the second component,
   wherein the first flange is fixed to the second component and
   wherein the second flange is fixed to the first component.

8. A reel according to claim 7,
wherein the third cable is fixed to the second flange.

9. A reel according to claim 7,
wherein the second cable is received in a second magazine delimited axially by the first flange and by the first component.

10. A reel comprising a first component movable in rotation in relation to a second component about an axis and a least one first cable fixed to the first component at at least one point,
   wherein the first cable is fixed to the second component at at least one point,
   wherein the first cable is wound spirally about the axis,
   wherein at least one further cable is wound spirally about the axis and separated from the first cable by a flange perpendicular to the axis,
   wherein said further cable is received in a magazine delimited axially by the flange and by the second component,
   wherein the magazine is delimited radially by a wall emanating from the flange, on the one hand, and by a hub of the second component, on the other hand,
   wherein the first cable passes through a duct provided in the hub, and
   wherein said further cable passes through an orifice of said wall.

* * * * *